United States Patent [19]
Ostermeier

[11] 3,949,128
[45] Apr. 6, 1976

[54] PRODUCT AND PROCESS FOR PRODUCING A STRETCHABLE NONWOVEN MATERIAL FROM A SPOT BONDED CONTINUOUS FILAMENT WEB

[75] Inventor: Kurt W. Ostermeier, Menasha, Wis.

[73] Assignee: Kimberly-Clark Corporation, Neenah, Wis.

[22] Filed: Aug. 22, 1972

[21] Appl. No.: 282,684

[52] U.S. Cl. ............... 428/152; 156/183; 156/229; 156/290; 156/306; 428/221; 428/224; 428/284; 428/286; 428/296; 428/298
[51] Int. Cl.² .... B32B 3/00; B32B 5/22; D04H 1/04
[58] Field of Search ................... 161/150, 170, 148; 264/288, 289, 291, 292, 230, 231, 235, 346; 156/290, 229, 306, 183; 428/296, 298, 152, 284, 286, 224, 221

[56] References Cited
UNITED STATES PATENTS

| | | | |
|---|---|---|---|
| 3,047,444 | 7/1962 | Harwood | 264/288 X |
| 3,059,313 | 10/1962 | Harmon | 161/148 X |
| 3,341,394 | 9/1967 | Kinney | 161/150 X |
| 3,352,734 | 11/1967 | McIntyre | 161/150 X |
| 3,438,844 | 4/1969 | Kumin | 161/150 |
| 3,459,627 | 8/1969 | Vosburgh, Sr. | 161/150 X |
| 3,485,695 | 12/1969 | Ness | 161/148 X |
| 3,510,389 | 5/1970 | Olson | 161/150 X |
| 3,575,784 | 4/1971 | Philips et al. | 161/150 |
| 3,695,985 | 10/1972 | Brock et al. | 161/150 X |
| 3,748,216 | 7/1973 | Brock | 161/150 X |
| 3,772,417 | 11/1973 | Vogt | 264/230 |

FOREIGN PATENTS OR APPLICATIONS

| | | |
|---|---|---|
| 1,158,579 | 7/1969 | United Kingdom |
| 52,745 | 1/1971 | South Africa |

*Primary Examiner*—Lorraine T. Kendell
*Attorney, Agent, or Firm*—Wolfe, Hubbard, Leydig, Voit & Osann, Ltd.

[57] ABSTRACT

Fabric-like nonwoven, elastic materials of substantially continuous and randomly deposited, molecularly oriented filaments of a thermoplastic polymer are disclosed. Elasticity is achieved by causing the filaments to buckle either between spot bond areas disposed through out the material or as a result of a microcreping action and thereafter heat setting the filaments in their buckled configuration to provide a memory therefor, so that, on subsequent stretching and release of strain, the filaments will return to their buckled configuration. High bulk elastic laminates of the materials can also be prepared with ply attachment preferably being achieved by sonic bonding techniques.

9 Claims, 15 Drawing Figures

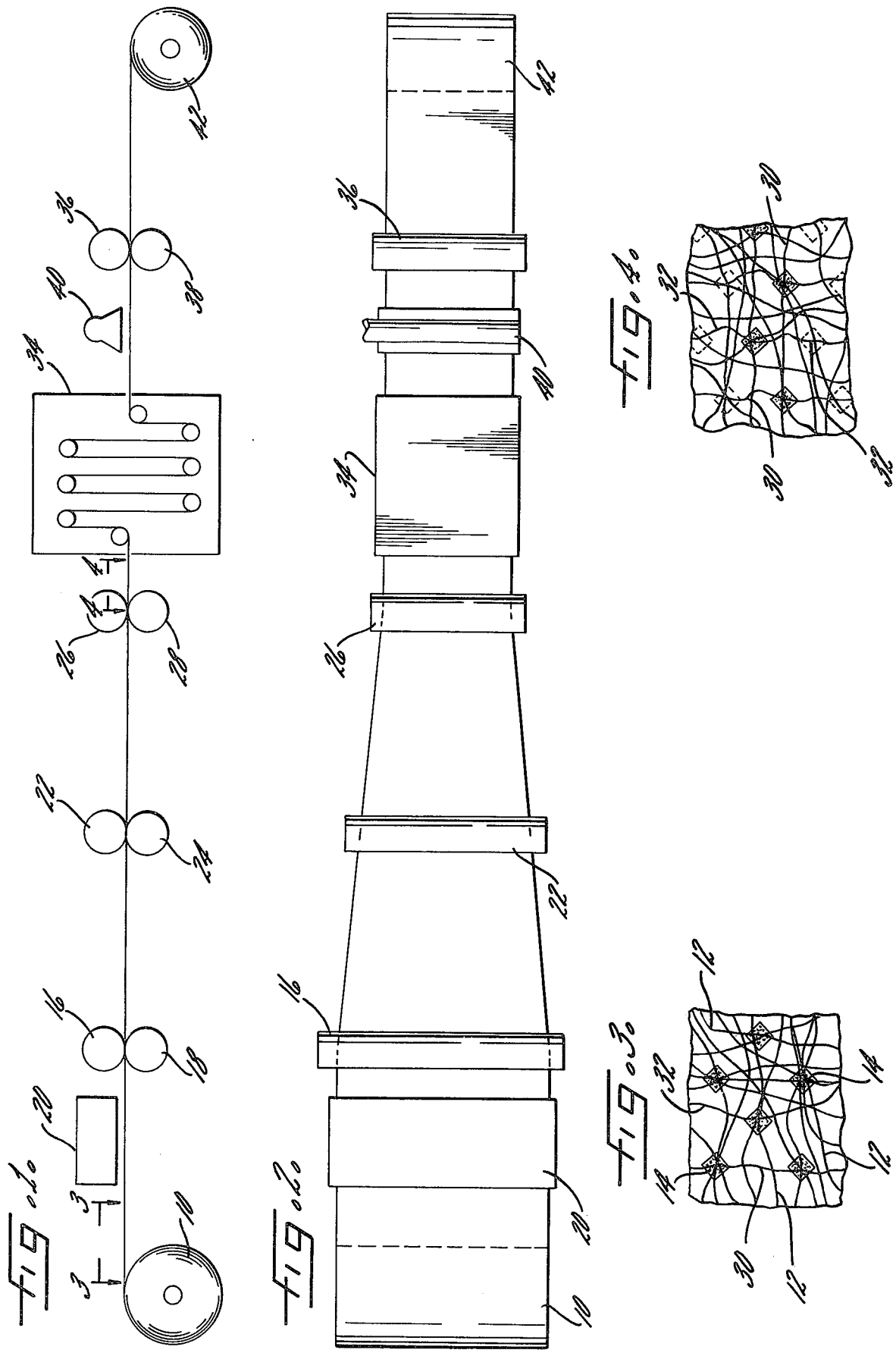

MD →

MD →

MD →

PRODUCT AND PROCESS FOR PRODUCING A STRETCHABLE NONWOVEN MATERIAL FROM A SPOT BONDED CONTINUOUS FILAMENT WEB

BACKGROUND OF THE INVENTION

The present invention relates to fabric-like webs of substantially randomly deposited continuous filaments of a thermoplastic polymer and, more particularly, to webs of this type which possess desirable elastic characteristics.

Nonwoven webs of substantially continuous and randomly deposited, molecularly oriented filaments of a thermoplastic polymer are widely known. Among others, the following patents illustrate a variety of methods for preparing such webs: Kinney (U.S. Pat. Nos. 3,338,992 and 3,341,394); Levy U.S. Pat. No. 3,276,944); Peterson (U.S. Pat. No. 3,502,538); Hartmann (U.S. Pat. Nos. 3,502,763 and 3,509,009); Dobo et al. (U.S. Pat. No. 3,542,615); and Harmon (Canadian patent 803,714).

While many different methods are illustrated for initially preparing continuous filament webs, the available methods generally have at least three common features. First, the methods of preparation involve continuously extruding a thermoplastic polymer (either from the melt or a solution) through a spinneret in order to form discrete filaments. Thereafter, the filaments are drawn (either mechanically or pneumatically) in order to molecularly orient the polymer filaments and achieve tenacity. Lastly, the filaments are deposited in a substantially random manner onto a carrier belt or the like and thereafter usually bonded to yield a stabilized web with substantially isotropic physical characteristics.

The continuous filaments in webs prepared as described above are not normally elastic. As a result, webs containing the filaments are not usually considered to be elastic materials. The lack of elasticity tends to eliminate the use of these continuous filament webs in many end use applications, such as for certain garment materials, where elasticity is necessary.

OBJECTS OF THE INVENTION

Accordingly, it is a principal object of the present invention to provide an elastic fabric-like material from a web of normally non-elastic continuous filaments of a thermoplastic polymer. Related to this principal object is the further object of providing a material wherein elasticity is present in at least two axial directions in the basic plane of the material.

An additional object resides in providing a material as characterized above wherein the elastic characteristics can be achieved without the necessity of including, along with the continuous filament web, other films, filaments, fibers or the like, and wherein an already bonded, and thereby stabilized, continuous filament web, can be used.

A further object is to provide a continuous filament web having the previously identified features wherein elasticity can be achieved without substantial filament rupture or otherwise adversely affecting the strength or other physical characterisitics of the continuous filaments themselves.

A still further object is to provide an elastic continuous filament web having a desirable soft surface feel.

An additional important object resides in providing high bulk elastic materials from continuous filament webs. And related to this object is the further object of providing a method whereby elastic continuous filament webs can be laminated together to provide high bulk elastic materials wherein good ply attachment is achieved without detrimentally affecting the textile and physical characteristics of the webs.

Other objects and advantages of the present invention will become apparent upon reading the following detailed description taken in combination with the attached drawings wherein:

FIG. 1 is a schematic side elevation view of apparatus which can be used in preparing materials embodying the features of the present invention;

FIG. 2 is a top plan view of the apparatus illustrated in FIG. 1;

Figure 5:
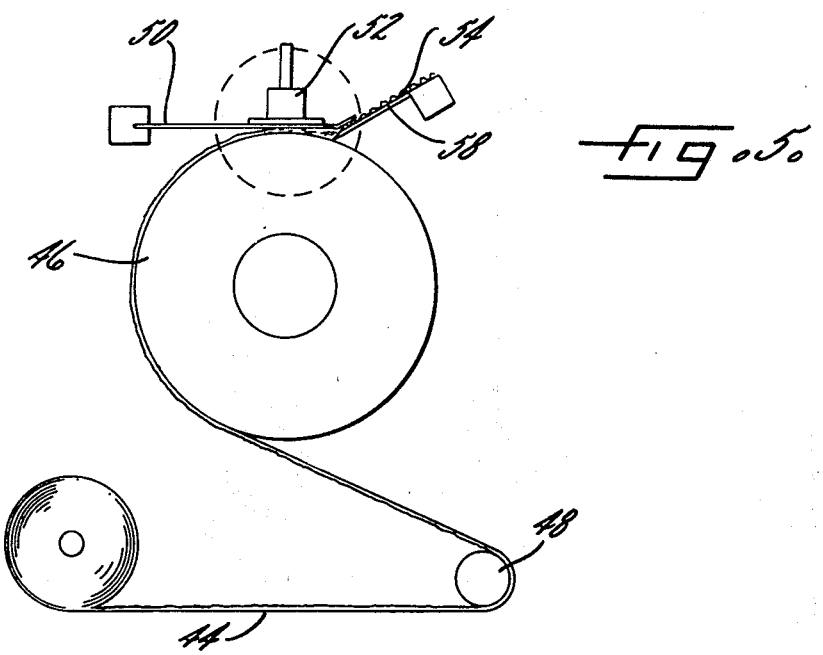
Figure 6:
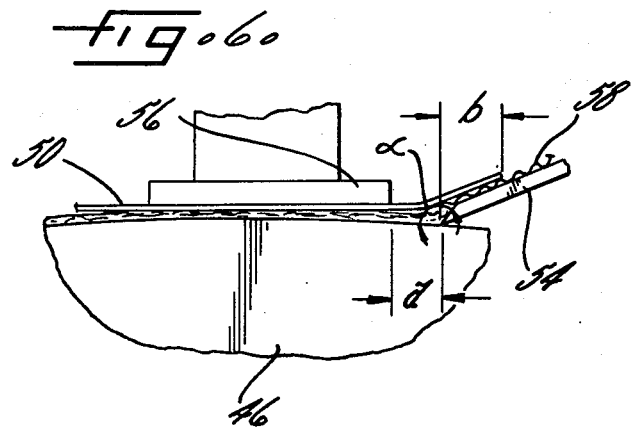
Figure 8:
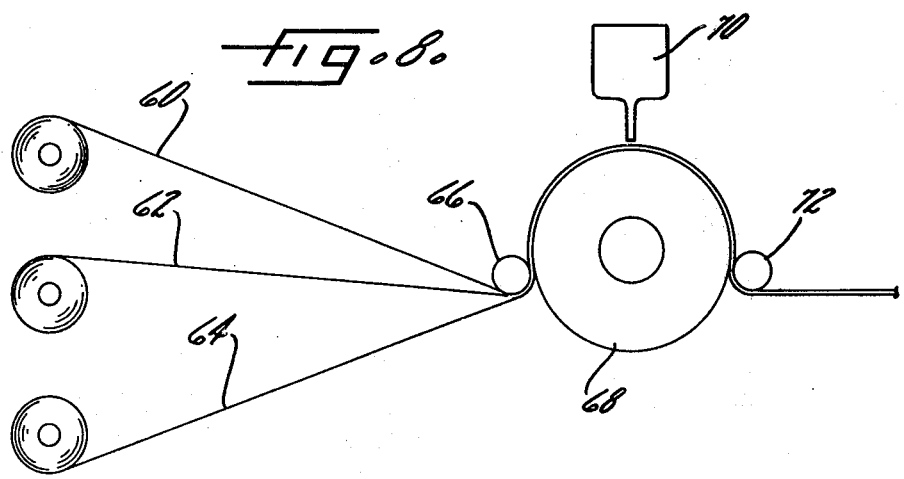

FIGS. 3 and 4 are greatly enlarged views of a segment of a continuous filament web taken along lines 3—3 and 4—4 of FIG. 1, respectively;

FIG. 5 is a schematic side elevation view of other apparatus which can be used in preparing materials embodying the features of the present invention;

FIG. 6 is a greatly enlarged view of the circular dashed portion depicted in FIG. 5;

FIG. 8 is a schematic side elevation view of apparatus useful in preparing laminates of continuous filament webs; and FIGS. 9–15 are greatly enlarged photomicrographs of materials embodying the features of the present invention.

DESCRIPTION OF THE PREFERRED EMBODIMENTS

While the invention is susceptible of various modifications and alternative constructions, there is shown in the drawings and will herein be described in detail the preferred embodiments. It is to be understood, however, that it is not intended to limit the invention to the specific forms disclosed. On the contrary, it is intended to cover all modifications and alternative constructions falling within the spirit and scope of the invention as expressed in the appended claims.

Turning now to the drawings, FIGS. 1 and 2 schematically illustrate apparatus useful for preparing elastic materials embodying the features of the present invention and employing as a starting material a roll of continuous filament web 10. As illustrated in FIG. 3, the web 10 comprises a plurality of substantially randomly deposited and molecularly oriented continuous filaments 12 of a thermoplastic polymer which is stabilized, and thereby easily handleable, by the presence of the spot bonds 14 which extend substantially through the thickness of the web and are typically arranged in a regular pattern over the web surface. For use in the processes herein illustrated, webs having a basis weight of about 0.3–2 oz. /yd.$^2$ with the filaments thereof having a denier of about 0.5–10 are most suitable.

A useful manner of preparing such spot bonded continuous filament webs is disclosed in copending Hansen and Pennings application, entitled Pattern Bonded Continuous Filament Web, Ser. No. 177,077, filed Sept. 1, 1971. The method therein disclosed involves passing the web between a nip formed by two heated, hard surfaced rolls, one of which contains the plurality of raised points on its surface corresponding to the desired spot bond pattern. In addition to yielding a stable, autogenously bonded web, the disclosed method can be used to prepare webs wherein the filaments which are autogenously bonded in the spot bond areas have the capacity of pulling free from their bond areas rather than fracturing when placed under strain. As will be hereinafter discussed, the presence of such "releasable" bonds is useful in connection with the present invention.

Referring again to FIGS. 1 and 2, the driven (drive means not shown) smooth surface rolls 16, 18 unwind the web 10 from the illustrated roll and the unwound web 10 is then heated by the radiant heater 20. Such heating, which can also be present as the web is drawn as hereinafter described, aids in processing the web by diminishing the possibility of edge tearing.

In keeping with the present invention, after passage through the rolls 16, 18 nip, the web 10 is drawn twice in the machine direction, i.e., the direction of web travels, by means of the pairs of rolls 22, 24, and 26, 28 by driving the rolls 22, 24 at a higher speed than the rolls 16, 18 and similarly driving the rolls 26, 28 at a higher speed than the rolls 22, 24. Roll speeds are appropriately controlled such that the reduction in web width on entering the roll 22, 24 is about 15% and about 30% on entering the rolls 26, 28. While only a single set of draw rolls can be used, it is desirable to use the illustrated two sets since web tearing at the edges thereof can be minimized.

As illustrated by FIG. 4, drawing the web 10 in the manner depicted in FIG. 1 causes filaments in the web 10, such as 30 and 32, which lie at an angle to the machine direction to assume a non-linear configuration with respect to the web's cross direction, i.e., the direction normal to the machine direction. In other words, after the web is drawn, substantially no straight line filament segments exist between spot bonds in the direction substantially perpendicular to that of drawing. In realizing the advantages associated with the present invention, this feature is important since the non-linearity of the filaments in the cross direction permits the web to be stretched in that direction without an accompanying filament rupture. While it is not apparent from FIG. 4 which is only a two dimensional representation of the basic plane of the web 10 (i.e., the plane orthogonal to the direction of web thickness when the web is lying on a substantially flat surface), it should be understood that web drawing not only serves to cause filaments lying in the basic plane to assume a non-linear configuration with respect to the cross direction, but additionally can cause filaments to assume a non-linear configuration by buckling out of the plane of the material. Buckling of this type gives the resultant material a desirable lofty surface feel.

Turning again to FIG. 4 and considering it in combination with FIG. 3, it will be noted that the illustrated buckling of the filaments between spot bond areas is accompanied by movement of the spot bond areas 14 into closer relationship in the cross direction. The capacity for the bond areas to so move on drawing in the machine direction is important in order to achieve maximum non-linearity of filaments in the cross direction. In turn, the configuration of the bonds, with respect to pattern, size and density, is important. A bond pattern should be selected so that the Poisson ratio of the web exhibits a maximum as measured in the cross direction. The Poisson ratio is a well known parameter and is obtained by applying a tensile strain in a specific direction and measuring the strain in that direction and the strain which is induced in the direction orthogonal to the direction of applied strain. The Poisson ratio is the ratio of induced to applied strain.

With respect to continuous filament webs as illustrated herein, a maximum Poisson ratio as measured in the cross direction can be obtained when the bonds are arranged in a basic diamond pattern as illustrated in FIG. 3. The diamond is shown to comprise four bonds with the sides of the bonds lying at 45° to the machine direction with one of the diagonals of each bond being parallel to the machine direction and the other diagonal being perpendicular thereto.

Regarding the selection of appropriate bond densities and area coverage, several factors are important. Since it is an object of the present invention to provide a soft, drapable elastic material, the area of the web occupied by spot bonds desirably does not exceed about 50% and, preferably, does not exceed about 25%, e.g., 7–25%. The presence of excessive bonded area not only results in the preparation of stiff materials, but, additionally, restricts the illustrated filament buckling in the cross direction with the result that cross direction elasticity is limited. Bond densitites on the order of about 50–3200/in.$^2$ can be used though, preferably, the bond density is about 100–500/in.$^2$.

As previously indicated, the spot bonds in the continuous filament web 10 preferably permit filaments to release prior to fracturing when the web is subjected to strain. Since during the web drawing operation many of the filaments generally aligned in the machine direction are placed under tension before the desired degree of drawing is achieved and before other of said filaments are brought into machine direction alignment, the ability to release from the bond areas rather than fracture is important in preserving the overall strength characteristics of the web in the machine direction. By releasing when placed under tension rather than fracturing, a given filament is then available for further load bearing duty when it is again brought into tensioned alignment. As a result, the illustrated web drawing procedure can be effected without substantial filament rupture and, accordingly, the elastic materials prepared by the process illustrated herein have the desirable strength characteristics possessed by the initially prepared continuous filament web. The aforementioned Hansen and Pennings application illustrates the preparation and characteristics of preferred continuous filament webs containing "releasable" bonds. In particular, useful webs are characterized by a visual disappearance of the spot bonded areas and an accompanying audible pinging sound as the web is progressively strained.

Referring again to FIG. 1 after passage between the rolls 26, 28, the web containing the illustrated non-linear configured filaments in the cross direction is drawn through the oven 34 by means of the rolls 36, 38 which are driven at the same speed as the rolls 26, 28, the web is then cooled by means of the fan 40, and it is thereafter rolled up in the form 42. Passage of the web through the oven 34 heat sets the filaments in their non-linear configuration with respect to the web's cross direction and thereby provides a memory for the non-linear or buckled configuration. As a result, under cross-direction strain the web is stretchable due to the presence of the illustrated buckled filaments and will return to the buckled configuration on release of the strain. In other words, the web is elastically deformable in the cross-direction.

In order to effect the illustrated heat setting, it is necessary that the oven temperature and dwell time of the web within the oven be coordinated so that the filaments reach the appropriate temperature necessary to effect heat setting. With respect to molecularly oriented polypropylene filaments, heat setting can be effected at a temperature of about 130°–150°C. The use of lower temperatures does not effectively heat set the filaments to achieve elasticity even though the resulting web can be stretched or elongated in the cross-direction. Exposure to temperatures in excess of the indicated maximum of about 150°C. is accompanied by significant shrinkage of the buckled filaments with the result that the web loses its stretchability in the cross direction.

The FIG. 9–11 photomicrographics illustrate he appearance of a continuous filament web prepared in the manner described with reference to FIG. 1. The FIG. 9 photograph illustrates a web at about 12 times magnification while the FIGS. 10 and 11 photographs are at about 11 and 55 times magnification, respectively. For the purpose of illustration, the photographs were made with appropriate shadowing so as to highlight the presence of the previously discussed spot bond areas which are particularly apparent in the lower left hand corner of FIG. 9 and to a lesser degree throughout FIG. 10 and the right side of FIG. 11. Spot bonding was effected in the manner described in the Hansen and Pennings application at a bond density of about 214/in.$^2$ and an area coverage of about 17%.

Figure 9:
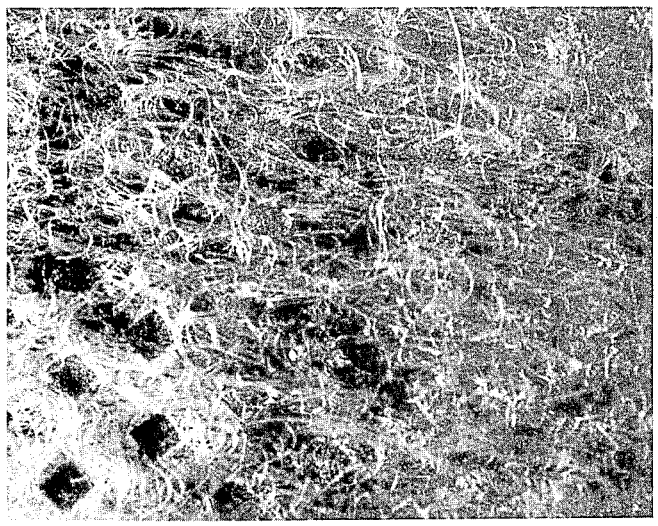
Figure 10:
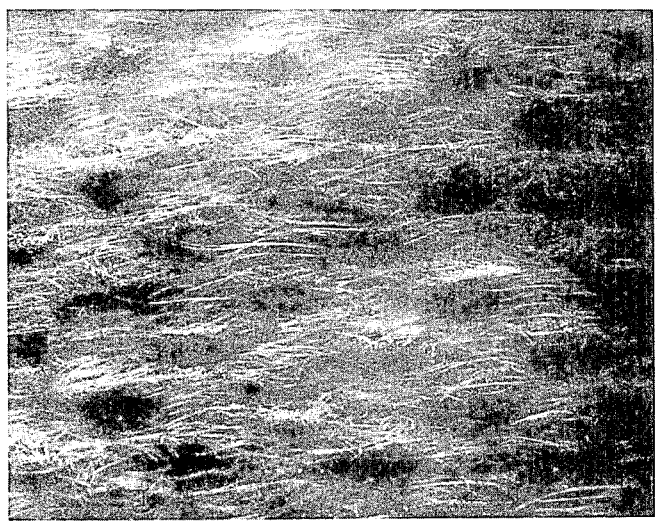
Figure 11:
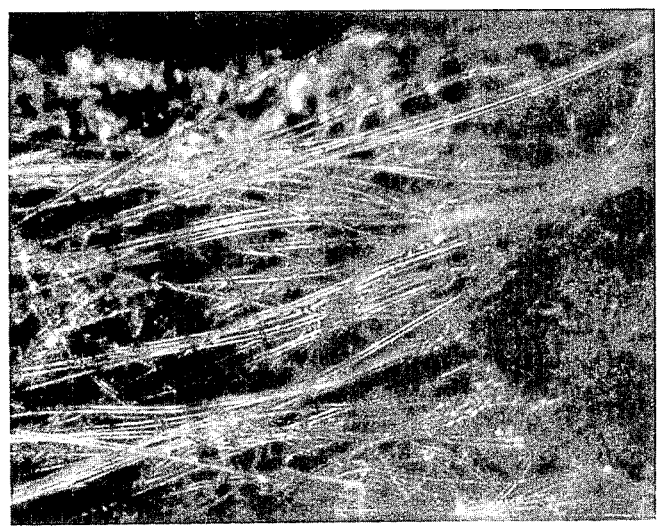

In FIGS. 9–11, the machine direction is indicated by the arrow and the pronounced buckling of the filaments in the cross direction and the straightening of the filaments in the machine direction is clearly evident. The web illustrated in these photographs had a basis weight (before drawing) of about 17 gram/yd.$^2$ and was formed from 1.5 denier polypropylene filaments. Prior to drawing, the web was pre-heated to about 100°C. with heating setting being effected at about 150°C. after drawing which resulted in a web width reduction of about 30%.

The web so prepared had the following characteristics: As reported in the present application, tensile measurements were made on 1 inch wide samples using an Instron machine and a crosshead speed of 5 inch/-min. Elastic recovery represents the ability of a web to spontaneously "spring back" after being stretched a given amount. The webs prepared as illustrated in this application are characterized as having substantially complete elastic recovery in at least one direction up to about 10% strain. This means that the webs can be stretched at least about 10% and will, on release of the stretch inducing strain, reassume their original dimensions. Elastic recovery measurements are made within about one minute after strain release.

| Basis Weight | 22 grms./yd.$^2$ |
|---|---|
| Thickness | 0.02 inch |
| Maximum Tensile Strength (lbs./inch width) | |
| M.D. | 3.75 |
| C.D. | 1.95 |
| Elongation (%) at Maximum Tensile Strength | |
| M.D. | 20 |
| C.D. | 65 |
| Elastic Recovery in Cross-Direction | |
| At 10% strain | 100% |
| At 20% strain | 83% |

Turning now to FIG. 5, there is illustrated an apparatus useful for preparing materials having elastic characteristics in the machine direction. As is apparent, the apparatus is similar to that used for microcreping paper. As shown, a continuous filament web 44 which can be similar to the web 10 depicted in FIG. 1 is forced against the surface of a rotating drum 46 by passage over the idler roll 48. The drum 46 can be heated in order to enhance the conformability of the web 44 during creping. Microcreping of the web 44 is accomplished by passing the web between the flexible blade 50 (which is forced by means of pressure applied to the assembly 52 into conformity with the drum surface over a portion of its length) and the drum 46 and into the pocket formed between the blade 50 and the rigid creping blade 54.

Referring to FIG. 6, the fineness of the crepe achieved in the manner depicted in FIG. 5 can be controlled by varying the size of the pocket which is defined by the distance $a$ between the end of the rubber member 56 of the pressure assembly 52 and the creping blade 54. The angle $\alpha$ which the creping blade makes with the drum surface can also be used to control the fineness of the crepe. After microcreping has been effected, the microcreped material 58 is then passed through an oven such as depicted in FIG. 1 in order to heat set the filaments in their microcreped condition. It is thereafter cooled and can then be wrapped up for storage.

Figure 7:
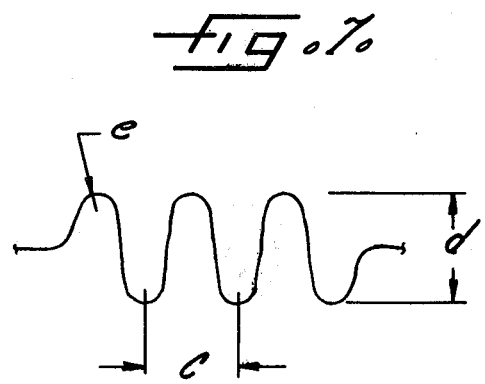

FIG. 7 schematically depicts, in cross section, an elastic material prepared in a manner illustrated in FIG. 5. The material is elastically deformable in the machine direction due to buckling of filaments out of the basic plane of the material in the depicted undulating fashion of crests and valleys thus positioning filaments in non-linear configuration with respect to the machine direction and subsequent heat setting in this configuration. The elongation of the material at maximum tensile strength can generally be defined by the amplitude $d$ and the wave period $c$ as being approximately (twice the amplitude minus the period divided by the period) times 100. Preferably, materials embodying the features of the present invention have an elongation in the machine direction of about 100–350%. Referring still to FIG. 7, $e$ defines the folding radius of the crepe folds in the material and is an important characteristic insofar as surface feel is concerned. A material with an excessively small folding radius will present a harsh surface feel and, accordingly, it is desirable to prepare a material with a folding radius of about 0.05–0.25 inch.

FIGS. 12–15 illustrate the appearance of the continuous filament web prepared in the manner described with reference to FIG. 5. The FIG. 12 photograph is at about 11 times magnification and the FIG. 13 photograph, depicting a cross sectional view, at about 24 times magnification.

Figure 12:
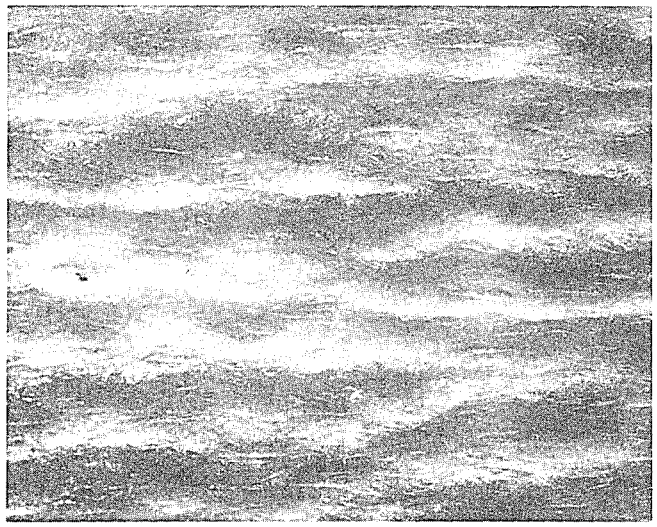
Figure 13:

The microcreped web illustrated in the FIG. 12 and 13 photographs was prepared from an initial continuous filament polypropylene web as previously described with respect to the FIG. 9–11 photographs. In accomplishing the illustrated microcreping, the following conditions were employed:

| Drum 46 | 24" diameter heated to 220°F. rotating at 7 ft./min. |
|---|---|
| Blade 50 | 0.004" steel with 34 psi applied by assembly 52 |
| Blade 54 | 0.028" steel with 37° grind angle |
| Distance "a" | 5/32" |
| Distance "b" | 1/32" |

-continued

Angle " "    122°

After heat setting at about 140°C. for about one minute the microcreped webs so prepared had the following characteristics:

| Basis weight | 45 grms./yd.$^2$ |
| --- | --- |
| Thickness | 0.03 inch |
| Tensile Strength (lbs./inch width) | |
| M.D. | 2.75 |
| C.D. | 12.3 |
| Elongation (%) at Maximum Tensile Strength | |
| M.D. | 260 |
| C.D. | 20 |
| Elastic Recovery in Cross direction | |
| At 10% strain | 100% |
| At 20% strain | 94% |
| At 40% strain | 80% |

While the present invention has been discussed with respect to the preparation of materials having elastic characteristics in either the cross or machine direction, the apparatus illustrated in FIGS. 1 and 5 can be used in sequence to prepare a material having elasticity in both the cross and machine directions. To this end, once a material having cross direction elasticity has been prepared such as in the manner illustrated with respect to FIG. 1, the material can then be used as the starting material for the preparation of machine direction elastic materials in accordance with the manner described with reference to FIG. 5. In this respect, however, it should be appreciated that it is important that the cross direction elastic characteristics be obtained first since the illustrated FIG. 1 procedure involves a machine direction stretching. Were machine direction elasticity first achieved, the microcreping effect would then be lost by the illustrated FIG. 1 sequence of stretching and heat setting.

The procedures for achieving elastic characteristics discussed with reference to FIGS. 1 and 5 is particularly applicable with respect to continuous filament webs initially having a basis weight of about 0.3–1.5 oz./yd.$^2$. Since during the illustrated processing, the basis weight of the material necessarily increases, if high basis weight starting materials are used, handling of the products becomes increasingly difficult. On the other hand, many end use applications require a high basis weight material and, to this end, FIG. 8 illustrates one manner in which high basis weight materials can be prepared from elastic materials prepared by either or both of the manners illustrated in FIGS. 1 and 5.

As therein shown in FIG. 8, elastic webs 60, 62 and 64 are unwound from their respective supply rolls and brought together into a three ply laminate at the idler roll 66. The laminate is then forced into contact with the hard surfaced roll 68 containing a plurality of raised points on its surface. Thereafter, the plies of the laminate are secured together by passing the laminate under the sonic bonding head 70 after which the laminate is removed from the roll 68 over the idler roll 72. The illustrated sonic bonding is accomplished by known techniques and, as opposed to other bonding techniques such as the application of heat and pressure, has been found to yield laminates with surprisingly good ply attachment without adversely affecting the desirable strength and fabric-like characteristics of the material.

Figure 15:
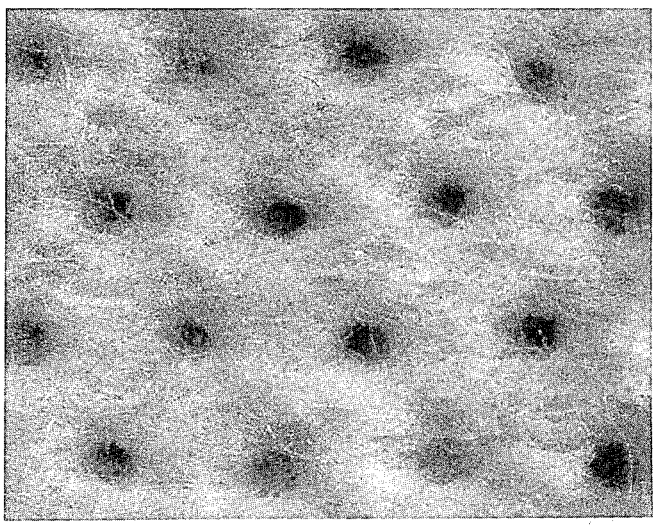
Figure 14:
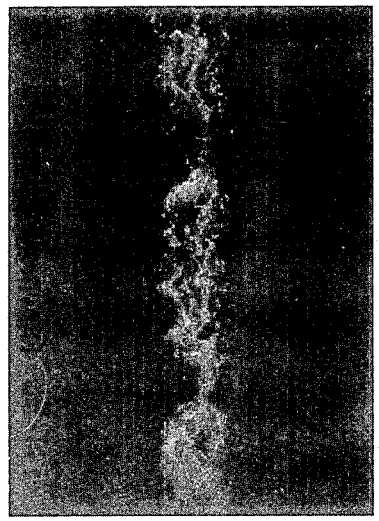

FIGS. 14 and 15, which are photographs at about 8.5 times magnification, illustrate four ply laminates prepared in a manner as depicted in FIG. 8 using four supply rolls. The sonic bond areas are clearly evident in both the FIG. 15 surface photograph and the FIG. 14 cross sectional photograph.

Two and three ply laminates were prepared in a manner as depicted in FIG. 8 (with two and three supply rolls, respectively) using machine direction elastic continuous filament webs prepared as described with reference to FIG. 5. Sonic bonding was accomplished with an ultrasonic Generator (Branson Model 200). The horn was 6 inches wide and ¼ inch thick in the direction of travel and a horn pressure of 80 psi was used. An 8 × 8 inch wire mesh screen covered the roll 68 on which the piled webs traveled at 50 ft./min.

The laminates so prepared had the following characteristics:

| | 2 Ply | 3 Ply |
| --- | --- | --- |
| Basis Weight (grms./yd.$^2$) | 90 | 141 |
| Thickness (inch) | 0.04 | 0.07 |
| Maximum Tensile Strength (lbs./inch width) | | |
| M.D. | 3.0 | 4.2 |
| C.D. | 16.0 | 20.1 |
| Elongation (%) at Maximum Tensile Strength | | |
| M.D. | 210 | 180 |
| C.D. | 25 | 30 |
| Elastic Recovery in Cross-Direction | | |
| At 20% strain | 100% | 100% |
| At 40% strain | 86% | 92% |

Thus, as has been illustrated, by means of the present invention there is provided an elastic material which fully satisfies the aims and objectives heretofore identified.

I claim as my invention:

1. A fabric-like, nonwoven material having bi-axial elasticity in the basic plane comprised of substantially continuous and randomly deposited, molecularly oriented filaments of a polyolefin thermoplastic polymer autogenously bonded together at intermittend regularly patterned areas throughout the material with unbonded spans of filaments between the bond areas, said filaments being heat set in undulating configuration with respect to the basic plane of said material to form a series of repeating crests and valleys which flatten into the basic plane on strain induced elongation of the material in the undulating direction and reassume their undulated configuration on strain release to provide substantially complete elastic recovery in the undulating direction up to at least about 10% strain, said material also containing unbonded spans of filaments disposed in non-linear, buckled configuration with respect to a second axial direction in the basic plane at an angle to the undulating direction and heat set therein such that, on strain induced elongation up to at least about 10% in the second axial direction, filaments align in said second axial direction and, on strain release, substantially spontaneously reassume their non-linear, buckled configuration, said regularly patterned areas occupying less than about 50% of the surface area of the material and distributed in a density of about 50–3200/in.$^2$.

2. The nonwoven elastic material of claim 1 wherein the undulating direction is orthogonal to the second axial direction.

3. The nonwoven elastic material of claim 2 wherein said regular pattern of discrete bond areas lie in the basic plane of said material.

4. The nonwoven elastic material of claim 3 wherein the thermoplastic polymer is polypropylene.

5. The nonwoven elastic material of claim 4 wherein the filaments are releasably bonded within the discrete bond areas so that when the material is strained filaments can pull free from the bond areas before fracture thereof.

6. The nonwoven elastic material of claim 4 wherein the discrete bond areas are patterned such that the material exhibits a maximum Poisson ratio when measured in the second axial direction in which the material is elastic.

7. The nonwoven elastic material of claim 6 wherein said discrete bond areas within which the filaments are bonded together are in a substantially regular pattern and distributed in a density of about 100–500/in.$^2$ with said areas combining to occupy about 7–25% of the surface area of the material.

8. A high bulk, elastic fabric-like nonwoven laminate comprising at least two plies of the material described in claim 1 united together at a plurality of discrete points to achieve good ply attachment without adversely affecting the desirable strength and fabric-like characteristics of the material.

9. The laminate of claim 8 wherein ply attachment is achieved by means of sonic bonding.

* * * * *